United States Patent
Kubota et al.

[11] Patent Number: 6,086,197
[45] Date of Patent: Jul. 11, 2000

[54] INK JET RECORDING METHOD USING INK AND REACTANT EACH HAVING A LOW SURFACE TENSION

[75] Inventors: Kazuhide Kubota; Kiyohiko Takemoto; Shinichi Kato, all of Suwa, Japan

[73] Assignee: Seiko Epson Corporation, Tokyo To, Japan

[21] Appl. No.: 08/939,033

[22] Filed: Sep. 26, 1997

[30] Foreign Application Priority Data

Sep. 27, 1996 [JP] Japan ................................ 8-256932
Nov. 13, 1996 [JP] Japan ................................ 8-302227
Sep. 12, 1997 [JP] Japan ................................ 9-249119

[51] Int. Cl.[7] ........................................ B41J 2/17
[52] U.S. Cl. ..................... 347/96; 106/31.13; 347/100
[58] Field of Search ............... 347/96, 95, 100, 347/105, 101, 103; 106/31.13, 31.25, 31.27

[56] References Cited

U.S. PATENT DOCUMENTS

| | | | |
|---|---|---|---|
| 5,619,241 | 4/1997 | Hosoi et al. ............................ | 347/105 |
| 5,750,592 | 5/1998 | Shinozuka et al. .................. | 347/100 X |
| 5,792,249 | 8/1998 | Shirota et al. ....................... | 347/100 X |
| 5,805,190 | 9/1998 | Tsuchii et al. ........................ | 347/100 |
| 5,837,754 | 11/1998 | Shimomura et al. ................ | 347/100 X |
| 5,847,026 | 12/1998 | Kitahara et al. .................... | 347/100 X |
| 5,854,307 | 12/1998 | Kimura et al. ....................... | 347/100 X |

FOREIGN PATENT DOCUMENTS

| | | |
|---|---|---|
| 0534634 | 3/1993 | European Pat. Off. . |
| 0697445 | 2/1996 | European Pat. Off. . |
| 0739743 | 10/1996 | European Pat. Off. . |
| 0791473 | 8/1997 | European Pat. Off. . |

*Primary Examiner*—Arthur T. Grimley
*Assistant Examiner*—Hoan Tran
*Attorney, Agent, or Firm*—Ladas & Parry

[57] ABSTRACT

An ink jet recording method includes the step of depositing a reaction solution and an ink composition onto a recording medium is disclosed. The ink composition used has a colorant, a resin emulsion and the like, and the reaction solution has a reactant reactive with the colorant and/or the resin emulsion and the like to produce an agglomerate, such as a polyvalent metal salt or a polyallylamine. The reaction solution and the ink composition each has a surface tension of less than 40 mN/m. A sodium polyoxyethylene alkyl ether sulfate, an anionic surfactant, is used in order to realize this surface tension.

9 Claims, 4 Drawing Sheets

INK JET RECORDING METHOD USING INK AND REACTANT EACH HAVING A LOW SURFACE TENSION

BACKGROUND OF THE INVENTION

1. Field of the Invention

The present invention relates to an ink jet recording method. More particularly, the present invention relates to an ink jet recording method wherein a reaction solution and an ink composition are deposited onto a recording medium.

2. Background Art

An ink jet recording method is a printing method wherein droplets of an ink composition are ejected and deposited onto a recording medium such as paper. This method has a feature that an image having a high resolution and a high quality can be realized at a high speed with a relatively inexpensive apparatus. In general, the ink composition used in the ink jet recording comprises water as a main solvent and, added thereto, a colorant and a wetting agent such as glycerin added for prevention of clogging and other purposes.

On the other hand, a new ink jet recording method has been recently proposed which comprises applying a polyvalent metal salt solution onto a recording medium and then applying an ink composition containing a dye material having at least one carboxyl group (e.g., Japanese Patent Laid-Open No. 202328/1993). According to this method, polyvalent metal ions combine with the dye to form an insoluble composite which can provide an image having water resistance and a high quality free from color bleeding.

Further, an ink jet recording method has been proposed wherein a color ink containing at least a surfactant or a penetrable solvent and a salt for imparting a penetrating property is used in combination with a black ink which cooperates with the salt to cause thickening or coagulation, thereby providing a high-quality color image having a high image density and free from color bleeding (Japanese Patent Laid-Open No. 106735/1994). More specifically, in this method, two liquids, i.e., a first liquid containing a salt and a second liquid of an ink composition, are printed to provide a good image.

Furthermore, other ink jet recording methods wherein two liquids are printed have been proposed, for example, in Japanese Patent Laid-Open Nos. 240557/1991 and 240558/1991.

SUMMARY OF THE INVENTION

The present inventors have now found that, in an ink jet recording method comprising printing such two liquids, use of a reaction solution and an ink composition each having a surface tension of less than 40 mN/m can realize a good print. The present invention has been made based on such finding.

Accordingly, an object of the present invention is to provide an ink jet recording method comprising printing two liquids, which can provide a good image.

According to one aspect of the present invention, there is provided an ink jet recording method comprising depositing a reaction solution containing a reactant and an ink composition onto a recording medium, the reaction solution and the ink composition each having a surface tension of less than 40 mN/m.

DETAILED DESCRIPTION OF THE INVENTION

Ink Jet Recording Method

Figure 1:
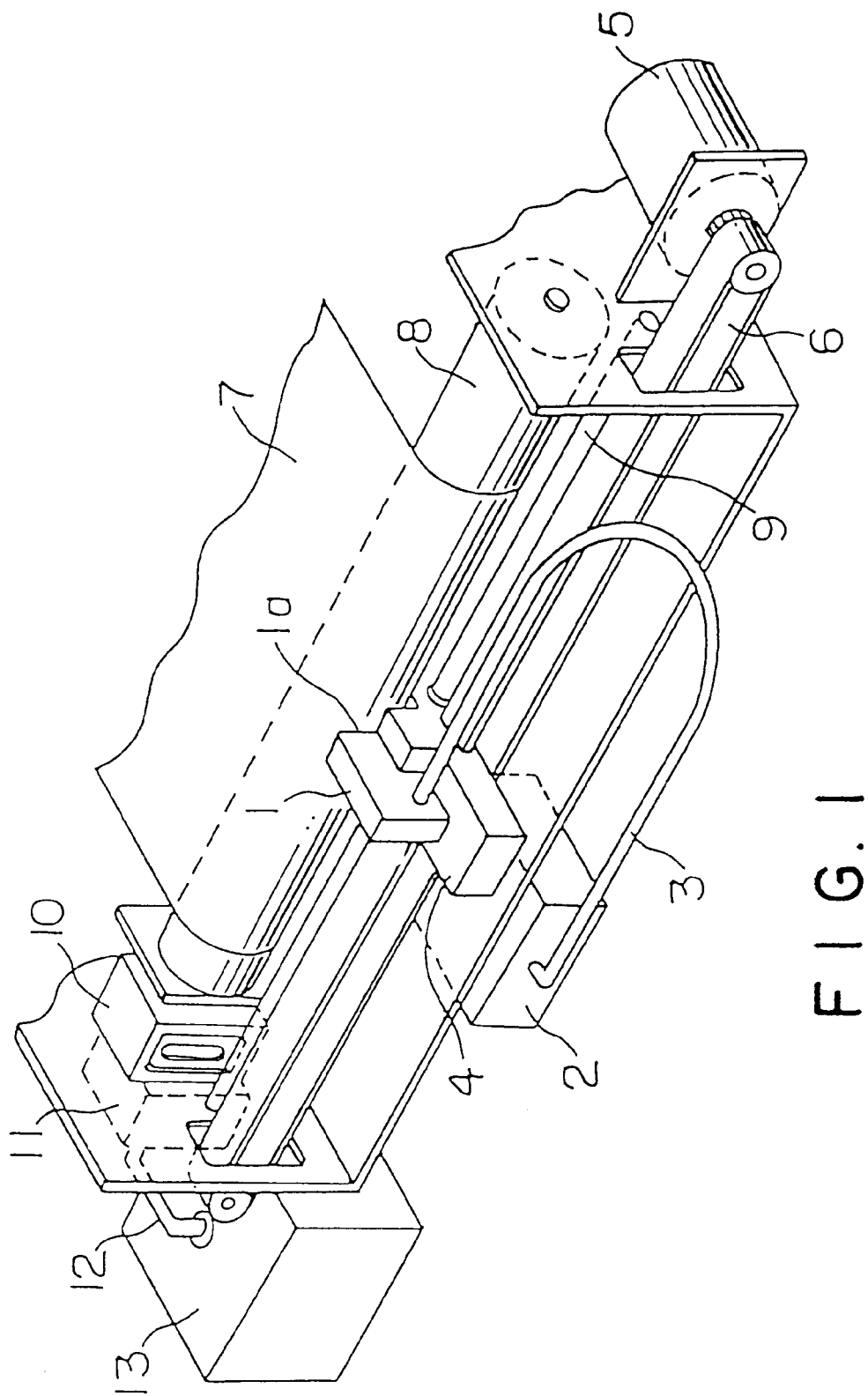
FIG. 1 shows an embodiment of the ink jet recording apparatus according to the present invention, wherein a recording head is provided separately from an ink tank to feed an ink composition and a reaction solution into a recording head through an ink tube.

The ink jet recording method according to the present invention comprises the step of depositing a reaction solution and an ink composition onto a recording medium. According to the present invention, both the reaction solution and the ink composition used have a surface tension of less than 40 mN/m. That is, the reaction solution and the ink composition used in the present invention have a very good wetting capability of less than 40 mN/m in terms of surface tension, that is, have good penetrability into the recording medium. According to the present invention, use of even an ink composition having high penetrability, which is generally considered to likely to cause feathering or bleeding, results in creation of no significant feathering or bleeding. In addition, use of an ink composition even in a small amount can realize a dot having a large diameter. On the other hand, it is possible to enjoy the advantage inherent in use of an ink composition having high penetrability, that is, fast drying of the print. Further, according to the present invention, an advantage can be offered that a high-quality image, which is excellent in color development of the print and less likely to cause feathering or bleeding, can be provided. In particular, since use of even a small amount of an ink can realize the formation of a dot having a large diameter, the consumption of the ink can be reduced. Further, since the amount of the ink deposited onto the recording medium can be reduced, reducing the creation of a cockle problem in paper.

The above surface tension of the reaction solution and the ink composition may be realized by adding a penetrant described below. Penetrants usable in the present invention will be described below in detail.

In the recording method using two liquids, like the ink jet recording method according to the present invention, a good print can be realized by contact of the reaction solution with the ink composition. Specifically, upon contact of the reaction solution with the ink composition, the reactant in the reaction solution breaks the state of dispersion of the pigment and other components in the ink composition, leading to agglomeration of the pigment and the like. The agglomerate is considered to deposit onto the recording medium, realizing a print having high color density and no significant bleeding or feathering and unevenness. Further, advantageously, in the case of a color image, uneven color-to-color intermixing in the region of boundary between different colors, that is, color bleeding, can be effectively prevented.

Reaction Solution

The reaction solution according to the present invention has a surface tension of less than 40 mN/m, preferably not more than 38 mN/m, more preferably not more than 35 mN/m. According to a preferred embodiment of the present invention, this surface tension may be realized by adding a penetrant. Penetrants usable in the present invention include various surfactants such as anionic, cationic, nonionic and amphoteric surfactants; alcohols such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

According to a more preferred embodiment of the present invention, the penetrating agent is a compound represented by the following formula (I) and/or a lower alcohol ether of a polyhydric alcohol.

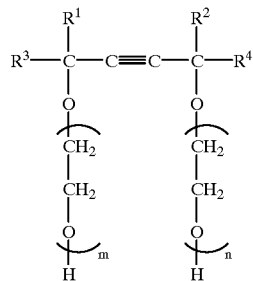

wherein $0 \leq m+n \leq 50$ and $R^1$ to $R^4$ each independently represent an alkyl group.

Specific preferred examples of compounds represented by the formula (I) include OLFINE Y, Surfynol 82, Surfynol 440, Surfynol 465, and Surfynol 485 (all the above products being manufactured by Air Products and Chemicals Inc.). They may be added alone or in a combination of two or more.

The reaction solution used in the present invention comprises a reactant which, upon contact with the ink composition, produces an agglomerate. The agglomerate is considered to be formed as a result of a reaction of the reactant with the colorant component in the ink composition. As described below, according to the present invention, the ink composition may comprise a resin emulsion and/or an inorganic oxide colloid. In this connection, according to the present invention, the reactant can break the state of dissolution and/dispersion of the resin emulsion and the inorganic oxide colloid.

The reactant used in the present invention is not limited so far as it has the above property. Preferred examples thereof include polyvalent metal salts and polyallylamines and derivative thereof.

The polyvalent metal salt usable as the reactant is constituted by divalent or higher polyvalent metallic ions and anions bonded to the polyvalent metallic ions and is soluble in water. Specific examples of polyvalent metallic ions include divalent metallic ions, such as $Ca^{2+}$, $Cu^{2+}$, $Ni^{2+}$, $Mg^{2+}$, $Zn^{2+}$, and $Ba^{2+}$, trivalent metallic ions, such as $Al^{3+}$, $Fe^{3+}$, and $Cr^{3+}$. Anions include $Cl^-$, $NO_3^-$, $I^-$, $Br^-$, $ClO_3^-$, and $CH_3COO^-$.

In particular, a metal salt constituted by $Ca^{2+}$ or $Mg^{2+}$ provides favorable results in terms of pH of the reaction solution and the quality of prints.

The concentration of the polyvalent metal salt in the reaction solution may be suitably determined so as to attain the effect of providing a good print quality and preventing clogging. It, however, is preferably about 0.1 to 40% by weight, more preferably about 5 to 25% by weight.

According to a preferred embodiment of the present invention, the polyvalent metal salt is constituted by divalent or higher polyvalent metallic ions and nitrate ions or carboxylate ions bonded to the polyvalent metallic ions and is soluble in water.

In this case, preferably, the carboxylate ions are derived from a saturated aliphatic monocarboxylic acid having 1 to 6 carbon atoms and a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon residue in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

The polyallylamine and polyallylamine derivative usable as the reactant are cationic polymers which are soluble in water and can be positively charged in water. Such polymers include, for example, those represented by the following formulae (II) to (IV):

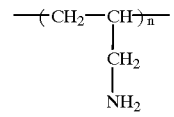

(II)

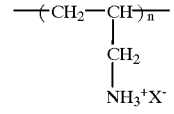

(III)

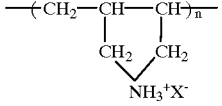

(IV)

wherein $X^-$ represents chloride, bromide, iodide, nitrate, phosphate, sulfate, acetate or other ion.

In addition, a copolymer of an allylamine with a diallylamine and a copolymer of diallylmethylammmonium chloride with sulfur dioxide may also be used.

The content of the polyallylamine and the polyallylamine derivative is preferably 0.5 to 10% by weight based on the reaction solution.

According to a preferred embodiment of the present invention, the reaction solution comprises a polyol in addition to the polyvalent metal salt. The polyol has a vapor pressure of not more than 0.01 mmHg at 20° C. The amount of the polyol added is such that the weight ratio of the polyol to the polyvalent metal salt is not less than 1, preferably 1.0 to 5.0. Further, according to a preferred embodiment of the present invention, the amount of the polyol added is preferably not less than 10% by weight, more preferably about 10 to 30% by weight, based on the reaction solution.

Specific examples of preferred polyols include polyhydric alcohols, for example, glycerin, diethylene glycol, triethylene glycol, 1,5-pentanediol, and 1,4-butanediol. Further specific examples of preferred polyols include saccharides, for example, monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose.

These polyols may be added alone or as a mixture of two or more. When the polyols are used as a mixture of two or more, the amount of the mixture added is such that the weight ratio of the total amount of the two or more polyols to the polyvalent metal salt is not less than 1.

According to a preferred embodiment of the present invention, the reaction solution comprises a wetting agent comprising a high-boiling organic solvent. The high-boiling organic solvent serves to prevent the reaction solution from being concentrated due to evaporation, thus preventing clogging of a recording head. Preferred examples of high-boiling organic solvents, some of which are those described above in connection with the polyol, include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, and triethylene glycol monoethyl ether, and triethylene glycol monobutyl ether; urea, 2-pyrrolidone, N-methyl-2-pyrrolidone, 1,3-dimethyl-2-imidazolidinone, and triethanolamine.

Although the amount of the high-boiling organic solvent added is not particularly limited, it is preferably about 0.5 to 40% by weight, more preferably about 2 to 20% by weight.

According to a preferred embodiment of the present invention, the reaction solution comprises a low-boiling organic solvent. Preferred examples of low-boiling organic solvents usable herein include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink. The amount of the low-boiling organic solvent added is preferably in the range of from 0.5 to 10% by weight, more preferably in the range of from 1.5 to 6% by weight.

According to a preferred embodiment of the present invention, the reaction solution contains triethanolamine for adjusting pH. When the triethanolamine is used, the amount thereof is preferably about 0 to 2.0% by weight.

A colorant, which will be described below in the paragraph of "Ink composition," may be added to color the reaction solution, thereby permitting the reaction solution to serve also as the ink composition.

Ink Composition

The ink composition to be used in the present invention has a surface tension of less than 40 mN/m, preferably not more than 38 mN/m, more preferably not more than 35 mN/m. According to a preferred embodiment of the present invention, this surface tension may be realized by adding a penetrant. Specific examples of penetrant usable herein include those as described above in connection with the reaction solution.

Further, according to a preferred embodiment of the present invention, the penetrant in the ink composition to be used in the present invention is preferably an anionic surfactant. The ink composition containing an anionic surfactant, especially an ink composition comprising a compound represented by the formula (V) described below, has excellent storage stability and high penetrability into the recording medium. In particular, by virtue of the latter property, an composition containing an anionic surfactant enables use of a small amount of the ink composition to realize a pixel (specifically a dot) having a large diameter. Further, the anionic surfactant hardly influences the reaction of the reactant in the reaction solution with the component in the ink composition, offering an advantage, inherent in the ink jet recording method using two liquids, that the realization of an image with no significant feathering or bleeding is not inhibited.

Specific examples of anionic surfactants usable herein include fatty acid soaps, N-acyl-N-methylglycine salts, N-acyl-N-methyl-β-alanine salts, salts of N-acylglutamic acid, salts of alkyl ether carboxylic acid, acylated peptide, salts of alkylsulfonic acid, salts of alkylbenzenesulfonic acid, salts of alkylnaphthalenesulfonic acid, polycondensate of salts of naphthalenesulfonic acid with formalin, salts of dialkylsulfosuccinic esters, salts of alkylsulfoacetic acids, salts of α-olefinsulfonic acids, N-acylmethyltaurine, sulfated oils, higher alcohol sulfuric ester salts, secondary higher alcohol sulfuric ester salts, alkyl ether sulfates, secondary higher alcohol ethoxysulfates, polyoxyethylene alkyl ether sulfates, polyoxyethylene alkylphenyl ether sulfates, monoglysulfates, fatty acid alkylol amidosulfuric ester salts, alkyl ether phosphoric ester salts, and alkylphosphoric ester salts.

According to a more preferred embodiment of the present invention, use of a sodium polyoxyethylene alkyl ether sulfate represented by the following formula (V) is particularly preferred:

$$RO(CH_2CH_2O)_nSO_3Na \qquad (V)$$

wherein R represents an alkyl group, preferably a straight-chain or branched alkyl group having 1 to 30 carbon atoms and n is an integer of 1 to 50.

Representative examples of compounds represented by the formula (V) include Hitenol 325D (available form Daiichi Kogyo Seiyaku Co., Ltd.).

The amount of the anionic surfactant added is preferably 0.01 to 5.0% by weight, more preferably 0.1 to 2% by weight, from the viewpoint of waterproofness of the formed image.

The ink composition to be used in the present invention comprises at least a colorant and water.

Preferably, the colorant in the ink composition to be used in the present invention can react with the reactant to form an agglomerate. The colorant may be either a dye or a pigment with the pigment being preferred.

Dyes usable herein include various dyes commonly used in ink jet recording, such as direct dyes, acid dyes, foodstuff dyes, basic dyes, reactive dyes, disperse dyes, vat dyes, soluble vat dyes, and reactive disperse dyes.

Regarding the pigment, inorganic and organic pigments are usable without any particular limitation. Examples of the inorganic pigment include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the above pigment is preferably added, to the ink, in the form of a pigment dispersion prepared by dispersing the pigment in an aqueous medium with the aid of a dispersant or a surfactant. Preferred dispersants include those commonly used in the preparation of a dispersion of a pigment, for example, polymeric dispersant. In this connection, that the dispersant and the surfactant in the dispersion of the pigment function also as the dispersant and the surfactant for the ink composition will be apparent to a person having ordinary skill in the art.

The amount of the pigment added to the ink is preferably about 0.5 to 25% by weight, more preferably about 2 to 15% by weight.

According to a preferred embodiment of the present invention, the ink composition comprises a resin emulsion. The term "resin emulsion" used herein refers to an emulsion comprising water as a continuous phase and the following resin component as a dispersed phase. Resin components as the dispersed phase include acrylic resin, vinyl acetate resin, styrene/butadiene resin, vinyl chloride resin, (meth)acrylate/ styrene resin, butadiene resin, styrene resin, crosslinked acrylic resin, crosslinked styrene resin, benzoguanamine resin, phenolic resin, silicone resin, and epoxy resin.

According to a preferred embodiment of the present invention, the resin is a polymer having a combination of a hydrophilic segment with a hydrophobic segment. The particle diameter of the resin component is not particularly limited so far as the resin component can form an emulsion. It, however, is preferably not more than about 150 nm, more preferably about 5 to 100 nm.

The resin emulsion may be prepared by dispersion polymerization of a resin monomer, optionally together with a surfactant, in water. For example, an emulsion of an acrylic resin or a styrene/acrylic resin may be prepared by subjecting an ester of (meth)acrylic acid or alternatively an ester of (meth)acrylic acid in combination with styrene to dispersion polymerization in water in the presence of a surfactant. In general, the mixing ratio of the resin component to the surfactant is preferably about 10:1 to 5:1. When the amount of the surfactant used falls within the above range, it is possible to provide an ink which has good water resistance in the form of an image and good penetrability. The surfactant is not particularly limited. Preferred examples thereof include anionic surfactants (for example, sodium dodecylbenzenesulfonate, sodium laurate and an ammonium salt of a polyoxyethylene alkyl ether sulfate); nonionic surfactants (for example, a polyoxyethylene alkyl ether, a polyoxyethylene alkyl ester, a polyoxyethylene sorbitan fatty acid ester, a polyoxyethylene alkyl phenyl ether, a polyoxyethylene alkylamine, and a polyoxyethylene alkylamide). They may be used alone or as a mixture of two or more. Further, it is also possible to use acetylene glycol (OLFINE Y and Surfynol 82, 104, 440, 465, and 485 (all the above products being manufactured by Air Products and Chemicals Inc.).

The ratio of the resin as the component constituting the dispersed phase to water is suitably 60 to 400 parts by weight based on 100 parts by weight of the resin with 100 to 200 parts by weight, based on 100 parts by weight of the resin, of water being preferred.

Known resin emulsions may also be used as the above resin emulsion. For example, resin emulsions described in Japanese Patent Publication No. 1426/1987 and Japanese Patent Laid-Open Nos. 56573/1991, 79678/1991, 160068/ 1991, and 18462/1992 as such may be used as the resin emulsion in the present invention.

Further, commercially available resin emulsions may also be used, and examples thereof include Microgel E-1002 and E-5002 (styrene/acrylic resin emulsion, manufactured by Nippon Paint Co., Ltd.), Voncoat 4001 (acrylic resin emulsion, manufactured by Dainippon Ink and Chemicals, Inc.), Voncoat 5454 (styrene/acrylic resin emulsion, manufactured by Dainippon Ink and Chemicals, Inc.), SAE-1014 (styrene/acrylic resin emulsion, manufactured by Nippon Zeon Co., Ltd.), and Saivinol SK-200 (acrylic resin emulsion, manufactured by Saiden Chemical Industry Co., Ltd).

In the ink used in the present invention, the amount of the resin emulsion incorporated therein is preferably such that the amount of the resin component is in the range of from 0.1 to 40% by weight, more preferably in the range of from 1 to 25% by weight.

The resin emulsion has the effect of inhibiting the penetration of a coloring component and, further, accelerating the fixation on the recording medium by virtue of an interaction between the resin emulsion and the reactant, particularly a polyvalent metal ion or polyallylamine or polyallylamine derivative. Further, some resin emulsions have an additional effect that they form a film on the recording medium to improve the rubbing resistance of the resultant print.

According to a preferred embodiment of the present invention, the ink composition contains a thermoplastic resin in the form of a resin emulsion. In this case, the thermoplastic resin has a softening temperature of 50 to 250° C., preferably 60 to 200° C. The term "softening temperature" used herein refers to the lowest temperature among the glass transition temperature of the thermoplastic resin, the melting point of the thermoplastic resin, the temperature which brings the viscosity of the thermoplastic resin to $10^{11}$ to $10^{12}$ poises, the pour point of the thermoplastic resin, and the minimum film forming temperature (MFT) in the form of an emulsion of the thermoplastic resin. In the step of heating according to the method of the present invention, the recording medium is heated to at least the softening temperature of the thermoplastic resin.

Further, preferably, the thermoplastic resin, when heated at the softening or melting temperature or a higher temperature and then cooled, forms a strong film having water resistance and rubbing resistance.

Specific examples of water-insoluble thermoplastic resins include, but are not limited to, polyacrylic acid, polymethacrylic acid, an ester of polymethacrylic acid, polyethylacrylic acid, a styrene/butadiene copolymer, polybutadiene, an acrylonitrile/butadiene copolymer, a chloroprene copolymer, a fluororesin, polyvinylidene fluoride, polyolefin resin, cellulose, a styrene/acrylic acid copolymer, a styrene/methacrylic acid copolymer, polystyrene, a styrene/acrylamide copolymer, polyisobutyl acrylate, polyacrylonitrile, polyvinyl acetate, polyvinyl acetal, polyamide, rosin resin, polyethylene, a polycarbonate, a polyvinylidene chloride resin, a cellulosic resin, a vinyl acetate resin, an ethylene/vinyl acetate copolymer, a vinyl acetate/(meth)acrylate copolymer, a vinyl chloride resin, polyurethane, and a rosin ester.

Specific examples of low-molecular weight thermoplastic resins include polyethylene wax, montan wax, alcohol wax, synthetic oxide wax, an α-olefin/maleic anhydride copolymer, animal and vegetable waxes such as carnauba wax, lanolin, paraffin wax, and microcrystalline wax.

The ink composition to be used in the present invention may optionally contain an inorganic oxide colloid. Preferred examples of inorganic oxide colloids usable herein include colloidal silica and alumina colloid. These are generally a colloidal solution of ultrafine particles of $SiO_2$ or $Al_2O_3$ in water or an organic solvent. Commercially available inorganic oxide colloids are generally such that the dispersion medium is water, methanol, 2-propanol, n-propanol, xylene or the like and the diameter of $SiO_2$, $Al_2O_3$ and other particles is 5 to 100 nm. Further, pH of the colloidal solutions of inorganic oxide is, in many cases, adjusted to the acidic or alkaline side rather than the neutral region. This is because the stable dispersion region of the inorganic oxide colloid is present on the acidic side or the alkaline side. In adding the colloidal solution to the ink composition, pH of the stable dispersion region of the inorganic oxide colloid and pH of the ink should be taken into consideration.

The amount of the inorganic oxide colloid added to the ink composition is preferably 0.1 to 15% by weight, and addition of two or more inorganic oxide colloids is also possible.

According to a preferred embodiment of the present invention, the ink composition preferably comprises an alginic acid derivative. Preferred examples of alginic acid derivatives include alkali metal salts (for example, sodium salt and potassium salt of alginic acid), organic acid salts (for example, triethanolamine salt) of alginic acid, and ammonium alginate.

The amount of the alginic acid derivative added to the ink composition is preferably about 0.01 to 1% by weight, more preferably about 0.05 to 0.5% by weight.

Although the reason why a good image can be formed by the addition of an alginic acid derivative has not been elucidated yet, it is considered that the polyvalent metal salt present in the reaction solution reacts with the alginic acid derivative in the ink composition to vary the dispersed state of the colorant, promoting the fixation of the colorant onto the recording medium.

According to a preferred embodiment of the present invention, the ink composition preferably contains an organic solvent. The organic solvent is preferably a low-boiling organic solvent, and preferred examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink.

Further, according to a preferred embodiment of the present invention, the ink composition used in the present invention further comprises a wetting agent comprising a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the wetting agent added is preferably in the range of from 0.5 to 40% by weight, more preferably in the range of from 2 to 20% by weight, based on the ink.

The amount of the low-boiling organic solvent added is preferably 0.5 to 10% by weight, more preferably in the range of from 1.5 to 6% by weight, based on the ink.

According to a preferred embodiment of the present invention, the ink composition contains a saccharide. Examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein refers to saccharides, in a broad sense, including substances which widely exist in the natural world, such as alginic acid, α-cyclodextrin, and cellulose.

Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbitol.

The content of the above saccharide is suitably in the range of from 0.1 to 40% by weight, preferably 0.5 to 30% by weight, based on the ink.

Further, if necessary, pH adjustors, preservatives, antimolds and the like may be added.

Ink Jet Recording Apparatus

An ink jet recording apparatus for practicing the ink jet recording method according to the present invention will now be described with reference to the accompanying drawings.

FIG. 1 is a diagram showing an embodiment of an ink jet recording apparatus. In this embodiment, an ink composition and a reaction solution are accommodated in a tank and fed into a recording head through an ink tube. Specifically, a recording head 1 is communicated with an ink tank 2 through an ink tube 3. The interior of the ink tank 2 is partitioned, and a chamber for an ink composition, optionally a plurality of chambers respectively for a plurality of color ink compositions, and a chamber for a reaction solution are provided.

The recording head 1 is moved along a carriage 4 by means of a timing belt 6 driven by a motor 5. On the other hand, paper 7 as a recording medium is placed by a platen 8 and a guide 9 at a position facing the recording head 1. In this embodiment, a cap 10 is provided. A suction pump 11 is connected to the cap 10 in order to conduct the so-called "cleaning operation." The ink composition sucked by the pump 11 is resorvoired in a waste ink tank 13 through a tube 12.

Figure 2:
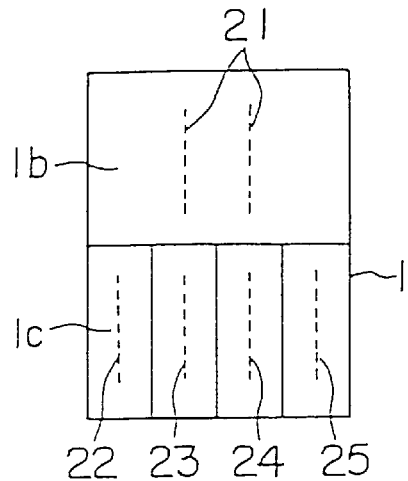
FIG. 2 is an enlarged view showing the surface of nozzles for a recording head, wherein reference character 1b designates the surface of a nozzle for a reaction solution and 1c the surface of a nozzle for an ink composition.

FIG. 2 is an enlarged view showing the surface of nozzles for the recording head 1. In the drawing, the surface of a nozzle for a reaction solution is indicated by 1b, and a nozzle 21 for ejecting the reaction solution is provided in the longitudinal direction. On the other hand, the surface of nozzles for the ink composition is indicated by 1c, and a yellow ink composition, a magenta ink composition, a cyan ink composition, and a black ink composition are ejected respectively through nozzles 22, 23, 24 and 25.

Figure 3:
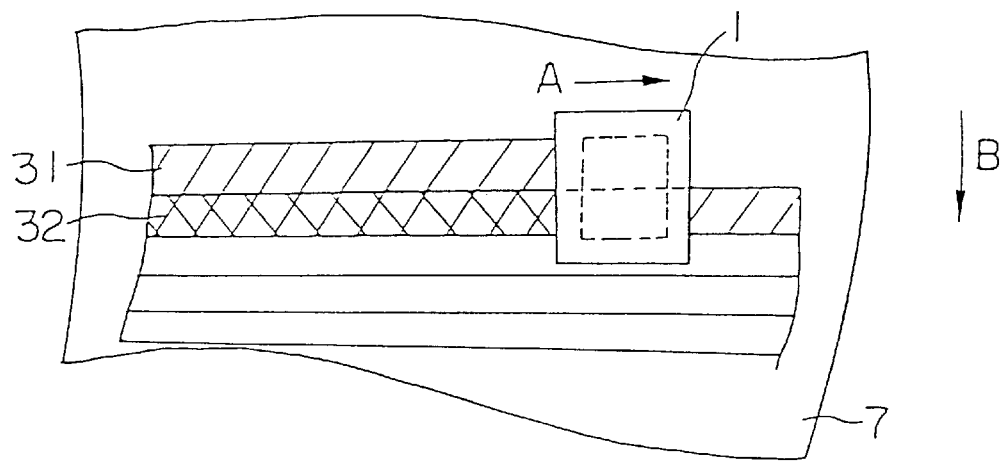
FIG. 3 is a diagram illustrating ink jet recording using the recording head shown in FIG. 2, wherein numeral 31 designates a region where a reaction solution has been deposited and numeral 32 a printed region where an ink composition has been printed on the deposited reaction solution.

Further, an ink jet recording method using the recording head shown in FIG. 2 will be described with reference to FIG. 3. The recording head 1 is moved in the direction indicated by an arrow A, during which time the reaction solution is ejected through the nozzle 21 to form a reaction solution-deposited region 31 in a band form on the recording medium 7. Subsequently, the recording medium 7 is transferred by a predetermined extent in the direction indicated by an arrow B, during which time the recording head 1 is moved the direction opposite to that indicated by the arrow A and returned to the left end of the recording medium 7, and the recording head conduct printing using the ink composition on the reaction solution-deposited region 31, thereby forming a print region 32.

Figure 4:
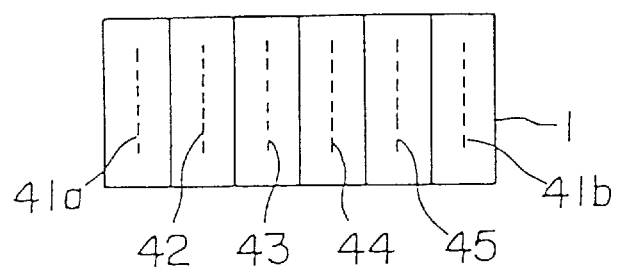
FIG. 4 shows another embodiment of the recording head according to the present invention, wherein all ejection nozzles are arranged in lateral direction.

Further, as shown in FIG. 4, in the recording head 1, it is also possible to arrange all nozzles in the lateral direction to construct a nozzle assembly. In the drawing, ejection nozzles for a reaction solution are denoted by 41a and 41b, and a yellow ink composition, a magenta ink composition, a cyan ink composition, and a black ink composition are ejected respectively through nozzles 42, 43, 44 and 45. In the recording head according to this embodiment, the recording head 1, when reciprocated on the carriage, can conduct printing in both directions. Therefore, in this case, printing at a higher speed is expected as compared with the case where the recording head shown in FIG. 2 is used.

Further, when the reaction solution and the ink composition are preferably adjusted so as to fall within the surface tension ranges described above, a high-quality print can be more stably provided regardless of the order of deposition of the reaction solution and the ink composition. In this case, even the provision of a single ejection nozzle suffices for satisfactory results. For example, in the drawing, the nozzle 41b may be omitted. This can contribute to a further reduction in size of the head and a further increase in printing speed.

Figure 5:
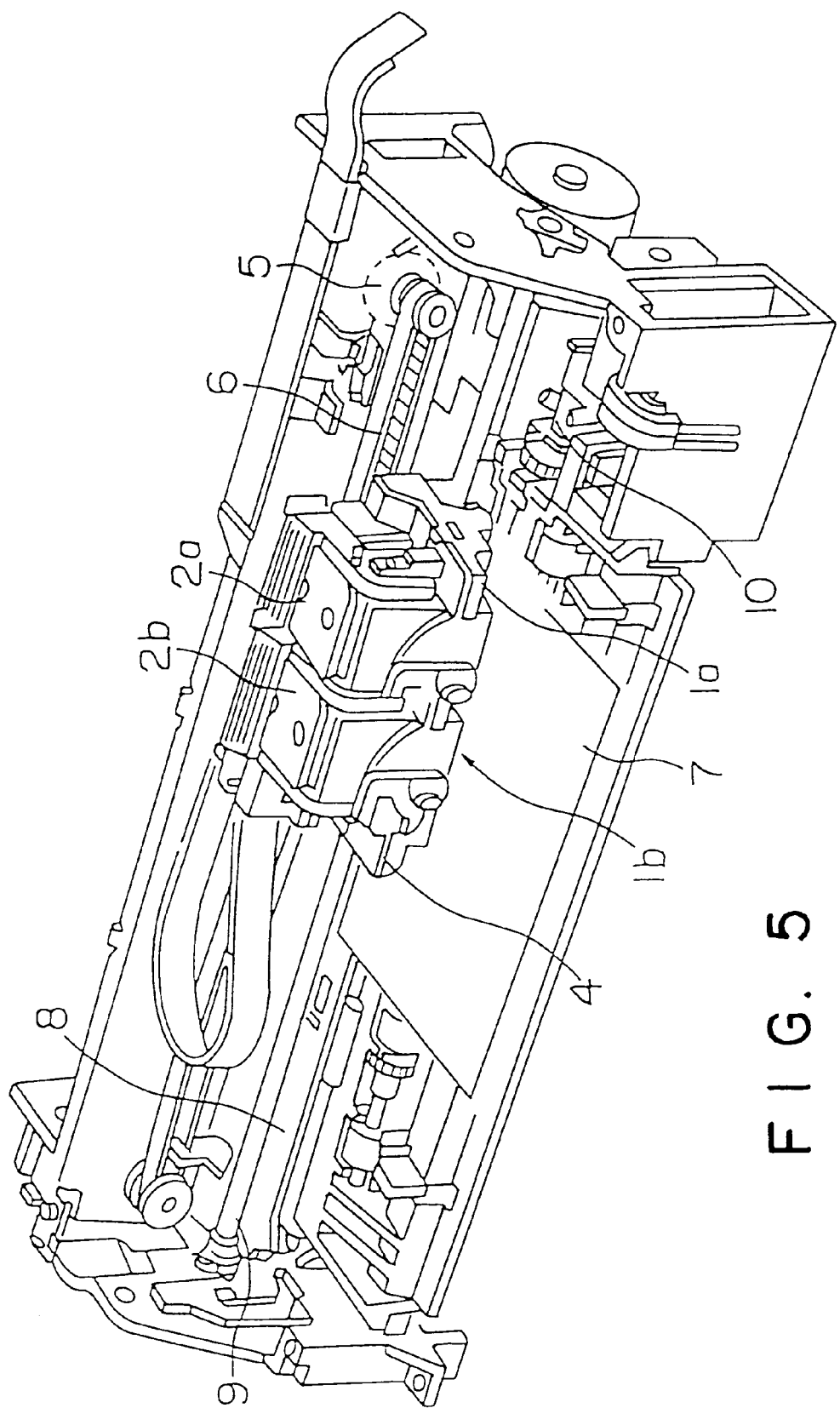
FIG. 5 shows an embodiment of the ink jet recording apparatus according to the present invention, wherein a recording head is integral with an ink tank.

In the ink jet recording apparatus, the supplement of the ink composition may be carried out by replacing an ink tank in a cartridge form. The ink tank may be integral with the recording head. A preferred embodiment of an ink jet recording apparatus using such an ink tank is shown in FIG. 5. In the drawing, the same members as used in the apparatus shown in FIG. 1 have the same reference numerals. In the embodiment shown in FIG. 5, recording heads 1a and 1b are integral respectively with ink tanks 2a and 2b. An ink composition and a reaction solution are ejected respectively through the recording heads 1a and 1b. Basically, printing may be conducted in the same manner as described above in connection with the apparatus shown in FIG. 1. Further, in this embodiment, the recording head 1a is moved together with the ink tank 2a on a carriage 4, while the recording head 1a is moved together with the ink tank 2b on the carriage 4.

Figure 6:
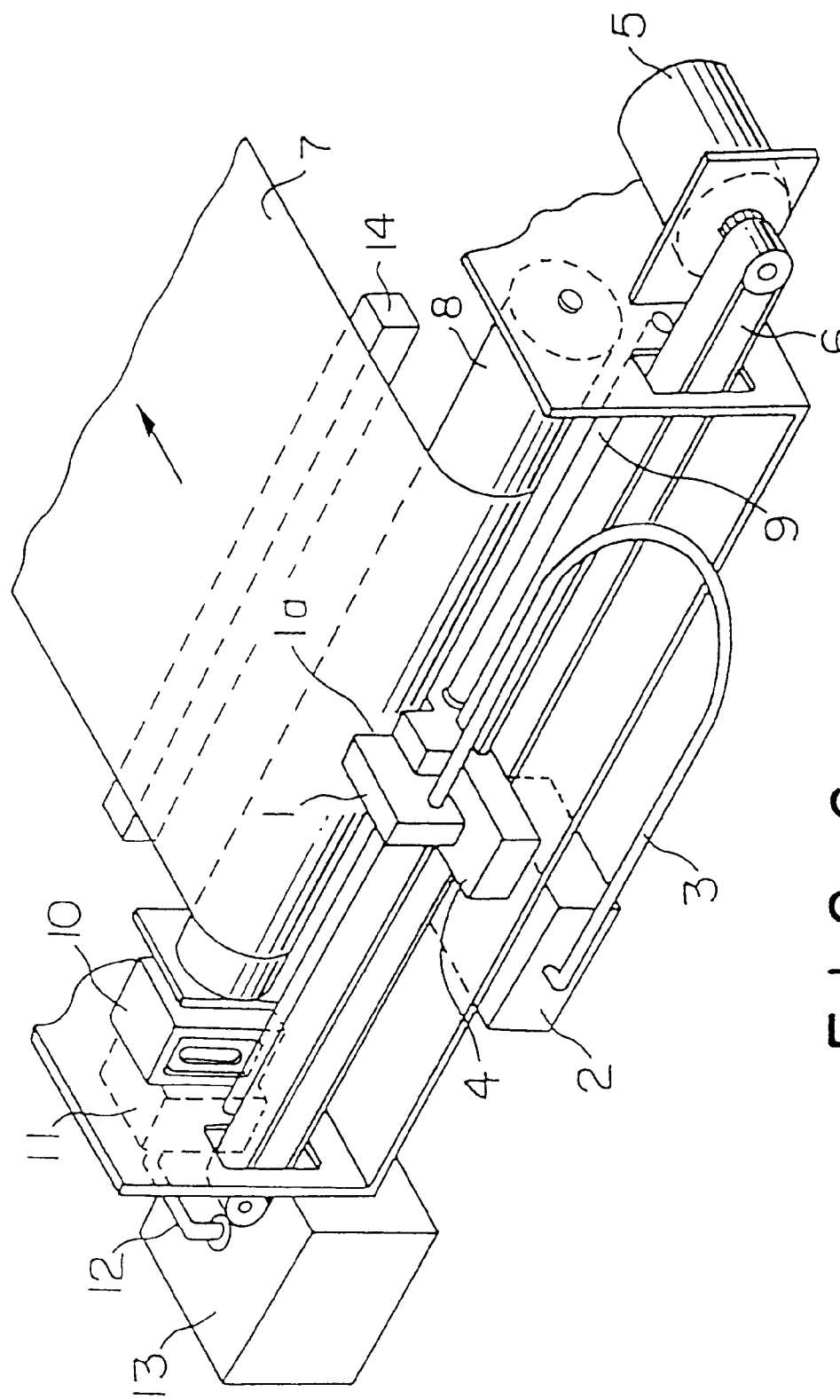
FIG. 6 shows another embodiment of the ink jet recording apparatus according to the present invention, wherein a heater is provided to heat a recording medium after printing.

A preferred embodiment of an ink jet recording apparatus wherein a heater for heating a printed recording medium is further provided is shown in FIG. 6. The embodiment shown in FIG. 6 is the same as the embodiment shown in FIG. 1, except that a heater 14 is additionally provided. The heater 14 may be of a contact type wherein, in heating the recording medium, it is brought into contact with the recording medium. Alternatively, the heating means may be of a non-contact type where the recording medium is heated by applying infrared rays or the like or blowing hot air to the recording medium.

The reaction solution may be deposited onto the recording medium by any of an embodiment where the reaction solution is selectively deposited on only an area where the ink composition is to be deposited and an embodiment where the reaction solution is deposited on the whole surface of paper. The former embodiment can minimize the consumption of the reaction solution and, hence, is cost-effective. In this embodiment, however, an accuracy is required to some extent with respect to the position where both the reaction solution and the ink composition are deposited. On the other hand, for the latter embodiment, the requirement for the accuracy of the position where the reaction solution and the ink composition are deposited is relaxed as compared with the former embodiment. In this embodiment, however, since the reaction solution is deposited in a large amount on the whole surface of paper, the paper is likely to cause curling during drying. For the above reason, the selection of the embodiment may be determined by taking a combination of the ink composition with the reaction solution into consideration. In the case of the former embodiment, the deposition of the reaction solution can be performed by ink jet recording.

EXAMPLES

The present invention will be described in more detail with reference to the following examples, though it is not limited to these examples only.

Example A

The following reactants A1 and A2 and the following inks A1 and A2 were prepared according to a conventional method. Specifically, the reaction solution was prepared by mixing the following ingredients together. The ink composition was prepared by dispersing the colorant component together with the dispersant component, adding other ingredients, mixing them together, and removing insolubles having a given size or larger by filtration.

| Reaction solution A1 | |
| --- | --- |
| Magnesium nitrate hexahydrate | 25 wt % |
| Triethylene glycol monobutyl ether | 10 wt % |
| Glycerin | 20 wt % |
| Ion-exchanged water | Balance |
| Reaction solution A2 | |
| Magnesium nitrate hexahydrate | 25 wt % |
| Glycerin | 20 wt % |
| Ion-exchanged water | Balance |
| Ink A1 | |
| Pigment C.I. Pigment Blue 15:3 | 8 wt % |
| Liquid medium | |
| Styrene/acrylic copolymer ammonium salt (molecular weight 7000, resin component 38 wt %; dispersant) | 1.5 wt % |
| Grandoll PP-1000 (styrene/acrylic resin emulsion, resin component 45%, manufactured by Dainippon Ink and Chemicals, Inc.) | 7 wt % |
| Maltitol | 7 wt % |
| Glycerin | 10 wt % |
| 2-Pyrrolidone | 2 wt % |
| Ion-exchanged water | Balance |
| Ink A2 | |
| Pigment C.I. Pigment Blue 15:3 | 3 wt % |
| Liquid medium | |
| Styrene/acrylic copolymer ammonium salt (molecular weight 7000, resin component 38 wt %: dispersant) | 1.5 wt % |
| Voncoat 5454 (styrene/acryiic resin emulsion, resin component 45%, manufactured by Dainippon Ink and Chemicals, Inc.) | 5 wt % |
| Snowtex S (colloidal silica, SiO₂ content 30 wt %, manufactured by | 1.5 wt % |

-continued

| | |
|---|---|
| Nissan Chemical Industry Ltd.) | |
| Maititol | 7 wt % |
| Glycerin | 10 wt % |
| 2-Pyrrolidone | 2 wt % |
| Surfynol 465 | 0.8 wt % |
| Ion-exchanged water | Balance |

The surface tension of the reaction solutions and the ink composition was as summarized in the following Table 1.

TABLE 1

| Surface tension | (mN/m) |
|---|---|
| Reaction solution A1 | 36.7 |
| Reaction solution A2 | 50.2 |
| Ink A1 | 48.0 |
| Ink A2 | 33.0 |

Evaluation test A1

The following combinations of reaction solutions with inks were used to conduct printing by means of an ink jet printer MJ-700V2C. The reaction solution was printed (100% duty) onto the following recording papers, followed by printing of a ruled line pattern thereon using the ink. The width of the printed ruled lines was measured.

The weight of the ink and the reaction solution was constant and 0.05 μg/dot, and the ruled line width is the average of data on the following six papers used for the evaluation.

Papers for evaluation:
(1) Xerox P (Xerox Corp.)
(2) Ricopy 6200 (Ricoh Co. Ltd.)
(3) Xerox 4024 3R 721 (Xerox Corp.)
(4) Neenah Bond (Kimberly-Clark)
(5) Xerox R (Xerox Corp.)
(6) Yamayuri (Honshu Paper Co., Ltd.)

The results were as summarized in Table 2.

TABLE 2

| | Reaction solution | Ink | Average line width (μm) |
|---|---|---|---|
| Example 1 | A1 | A2 | 110 |
| Comparative Example 1 | A1 | A1 | 80 |
| Comparative Example 2 | A2 | A1 | 65 |
| Comparative Example 3 | A2 | A2 | 75 |

Example B

The following reaction solution B1 and the following inks B1, B2, B3, and B4 were prepared in the same manner as in Example A.

| Reaction solution B1 | |
|---|---|
| Magnesium nitrate hexahydrate | 25 wt % |
| Triethylene glycol monobutyl ether | 10 wt % |
| Glycerin | 10 wt % |
| Surfynol 465 | 1 wt % |
| Surfynol TG | 1 wt % |
| Ion-exchanged water | Balance |
| Ink B1 | |
| Pigment C.I. Pigment Blue 15:3 | 3 wt % |
| Liquid medium | |
| Styrene/acrylic copolymer ammonium salt (molecular weight 7000, resin component 38 wt %: dispersant) | 1.5 wt % |
| Voncoat 5454 (styrene/acrylic resin emulsion, resin component 45%, manufactured by Dainippon Ink and Chemicals, Inc.) | 5 wt % |
| Snowtex S (colloidal silica, $SiO_2$ content 30 wt %, manufactured by Nissan Chemical Industry Ltd.) | 1.5 wt % |
| Maltitol | 7 wt % |
| Glycerin | 10 wt % |
| 2-Pyrrolidone | 2 wt % |
| Hitenol 325D (sodium polyoxyethylene alkyl ether sulfate, manufactured by Dai-ichi Kogyo Selyaku Co., Ltd.) | 0.8 wt % |
| Ion-exchanged water | Balance |
| Ink B2 | |
| Pigment C.I. Pigment Yellow 109 | 3 wt % |
| Pigment C.I. Pigment Yellow 110 | 0.5 wt % |
| Liquid medium | |
| Styrene/acrylic copolymer ammonium salt (molecular weight 7000, resin component 38 wt %: dispersant) | 1.5 wt % |
| Voncoat 5454 (styrene/acrylic resin emulsion, resin component 45%, manufactured by Dainippon Ink and Chemicals, Inc.) | 5 wt % |
| Snowtex S (colloidal silica, $SiO_2$ content 30 wt %, manufactured by Nissan Chemical Industry Ltd.) | 1.5 wt % |
| Maltitol | 7 wt % |
| Glycerin | 10 wt % |
| 2-Pyrrolidone | 2 wt % |
| Hitenol 325D (sodium polyoxyethylene alkyl ether sulfate, manufactured by Dai-ichi Kogyo Selyaku Co., Ltd.) | 0.8 wt % |
| Ion-exchanged water | Balance |
| Ink B3 | |
| Pigment C.T. Pigment Red 122 | 3 wt % |
| Liquid medium | |
| Styrene/acrylic copolymer ammonium salt (molecular weight 7000, resin component 38 wt %: dispersant) | 1.5 wt % |
| Voncoat 5454 (styrene/acrylic resin emulsion, resin component 45%, manufactured by Dainippon Ink and Chemicals, Inc.) | 5 wt % |
| Snowtex S (colloidal silica, $SiO_2$ content 30 wt %, manufactured by Nissan Chemical Industry Ltd.) | 1.5 wt % |
| Maltitol | 7 wt % |
| Glycerin | 10 wt % |
| 2-Pyrrolidone | 2 wt % |
| Hitenol 325D (sodium polyoxyethylene alkyl ether sulfate, manufactured by Dai-ichi Kogyo Selyaku Co., Ltd.) | 0.8 wt % |
| Ion-exchanged water | Balance |
| Ink B4 | |
| Carbon black MA7 | 5 wt % |
| Liquid medium | |
| Styrene/acrylic copolymer ammonium sait (molecular weight 7000, resin component 38 wt %: dispersant) | 1.5 wt % |

-continued

| | |
|---|---|
| Voncoat 5454 (styrene/acrylic resin emulsion, resin component 45%, manufactured by Dainippon Ink and Chemicals, Inc.) | 5 wt % |
| Snowtex S (colloidal silica, SiO$_2$ content 30 wt %, manufactured by Nissan Chemical Industry Ltd.) | 1.5 wt % |
| Maltitol | 7 wt % |
| Glycerin | 10 wt % |
| 2-Pyrrolidone | 2 wt % |
| Hitenol 325D (sodium polyoxyethylene alkyl ether sulfate, manufactured by Dai-ichi Kogyo Seiyaku Co., Ltd.) | 0.8 wt % |
| Ion-exchanged water | Balance |

The surface tension of the above reaction solution and the above ink compositions was as summarized in Table 3.

TABLE 3

| Surface tension | (mN/m) |
|---|---|
| Reaction solution B1 | 33.5 |
| Ink B1 | 37.0 |
| Ink B2 | 38.6 |
| Ink B3 | 39.8 |
| Ink B4 | 38.2 |

Evaluation test B1: Measurement of dot diameter

An ink jet printer MJ-700V2C was used to conduct printing, at a density of 360 dots/in., of the reaction solution (100% duty) onto the following recording papers and then the ink. The dot diameter was then measured, and the results were evaluated according to the following criteria.

The weight of the ink and the reaction solution was constant and 0.05 μg/dot, and the dot diameter is the average of data on the following six papers used for the evaluation.

Papers for evaluation:
(1) Xerox P (Xerox Corp.)
(2) Ricopy 6200 (Ricoh Co. Ltd.)
(3) Xerox 4024 3R 721 (Xerox Corp.)
(4) Neenah Bond (Kimberly-Clark)
(5) Xerox R (Xerox Corp.)
(6) Yamayuri (Honshu Paper Co., Ltd.)

Evaluation criteria

Dot diameter of not less than 100 μm with the image quality being high: A

Dot diameter of not more than 100 μm with the image quality being poor: B

The results were as summarized in Table 4.

Evaluation test B2: Stability of ink

The stability of the inks B1 to B4 was evaluated as follows. Specifically, the ink was hermetically sealed and allowed to stand at 70° C. for one week or at 70° C. for two weeks to check for a change in property values (viscosity, surface tension, and pH value) and creation of deposits. The results were evaluated according to the following criteria.

Evaluation criteria

Standing at 70° C. for two weeks caused neither a change in property values nor creation of deposits: A Standing at 70° C. for two weeks caused a change in property values or creation of deposits: B Standing at 70° C. for one week caused a change in property values or creation of deposits: NG The results were as summarized in Table 4.

TABLE 4

| Ink | Dot diameter (μm) | Evaluation of dot diameter | Stability of ink |
|---|---|---|---|
| Ink B1 | 119 | A | A |
| Ink B2 | 128 | A | A |
| Ink B3 | 108 | A | A |
| Ink B4 | 122 | A | A |

Example C

The following reaction solution C1 and the following inks C1, C2, C3, and C4 were prepared in the same manner as in Example A.

| | |
|---|---|
| Reaction solution C1 | |
| Magnesium nitrate hexahydrate | 25 wt % |
| Triethyiene glycol monobutyl ether | 10 wt % |
| Glycerin | 10 wt % |
| Surfynol 465 | 1 wt % |
| Surfynol TG | 1 wt % |
| Ion-exchanged water | Balance |
| Ink C1 | |
| Pigment C.I. Pigment Blue 15:3 Liquid medium | 3 wt % |
| Styrene/acrylic copolymer ammonium salt (molecular weight 7000, resin component 38 wt %: dispersant) | 1.5 wt % |
| Voncoat 5454 (styrene/acrylic resin emulsion, resin component 45%, manufactured by Dainippon Ink and Chemicals, Inc.) | 5 wt % |
| Snowtex S (colloidal silica, SiO$_2$ content 30 wt %, manufactured by Nissan Chemical Industry Ltd.) | 1.5 wt % |
| Maltitol | 7 wt % |
| Glycerin | 10 wt % |
| 2-Pyrrolidone | 2 wt % |
| Hitenol 325D (sodium polyoxyethylene alkyl ether sulfate, manufactured by Dai-ichi Kogyo Seiyaku Co., Ltd.) | 0.8 wt % |
| Ion-exchanged water | Balance |
| Ink C2 | |
| Pigment C.I. Pigment Yellow 109 | 3 wt % |
| Pigment C.I. Pigment Yellow 110 Liquid medium | 0.5 wt % |
| Styrene/acrylic copolymer ammonium salt (molecular weight 7000, resin component 38 wt %: dispersant) | 1.5 wt % |
| Voncoat 5454 (styrene/acrylic resin emulsion, resin component 45%, manufactured by Dainippon Ink and Chemicals, Inc.) | 5 wt % |
| Snowtex S (colloidal silica, SiO$_2$ content 30 wt %, manufactured by Nissan Chemical Industry Ltd.) | 1.5 wt % |

-continued

| | |
|---|---|
| Maltitol | 7 wt % |
| Glycerin | 10 wt % |
| 2-Pyrrolidone | 2 wt % |
| Hitenol NE-15 (ammonium polyoxyethylene alkylphenyl ether sulfate, manufactured by Dai-ichi Kogyo Seiyaku Co., Ltd.) | 0.8 wt % |
| Ion-exchanged water | Balance |
| Ink C3 | |
| Pigment C.I. Pigment Red 122 | 3 wt % |
| Liquid medium | |
| Styrene/acrylic copolymer ammonium salt (molecular weight 7000, resin component 38 wt %: dispersant) | 1.5 wt % |
| Voncoat 5454 (styrene/acrylic resin emulsion, resin component 45%, manufactured by Dainippon Ink and Chemicals, Inc.) | 5 wt % |
| Snowtex S (colloidal silica, $SiO_2$ content 30 wt %, manufactured by Nissan Chemical Industry Ltd.) | 1.5 wt % |
| Maltitol | 7 wt % |
| Glycerin | 10 wt % |
| 2-Pyrrolidone | 2 wt % |
| Neogen S-20 (sodium straight-chain dodecylbenzenesulfonate, manufactured by Dai-ichi Kogyo Seiyaku Co., Ltd.) | 0.8 wt % |
| Ion-exchanged water | Balance |
| Ink C4 | |
| Carbon black MA7 | 5 wt % |
| Liquid medium | |
| Styrene/acrylic copolymer ammonium salt (molecular weight 7000, resin component 38 wt %: dispersant) | 1.5 wt % |
| Voncoat 5454 (styrene/acrylic resin emulsion, resin component 45%, manufactured by Dainippon Ink and Chemicals, Inc.) | 5 wt % |
| Snowtex S (colloidal silica, $SiO_2$ content 30 wt %, manufactured by Nissan Chemical Industry Ltd.) | 1.5 wt % |
| Maltitol | 7 wt % |
| Glycerin | 10 wt % |
| 2-Pyrrolidone | 2 wt % |
| Niocol SW (sodium salt of dialkylsulfosuccinic ester, manufactured by Dai-ichi Kogyo Seiyaku Co., Ltd.) | 0.8 wt % |
| Ion-exchanged water | Balance |

The surface tension of the above reaction solution and the above ink compositions was as summarized in Table 5.

TABLE 5

| Surface tension | (mN/m) |
|---|---|
| Reaction solution C1 | 33.5 |
| Ink C1 | 37.0 |
| Ink C2 | 37.6 |
| Ink C3 | 38.9 |
| Ink C4 | 32.7 |

Evaluation test C1: Measurement of dot diameter

The above reaction solution C1 and the above inks C1 to C4 were tested in the same manner as in the evaluation test B1. The results were as summarized in the following Table 6.

Evaluation test C2: Stability of ink

The above inks C1 to C4 were tested in the same manner as in the evaluation test B2. The results were as summarized in Table 6.

TABLE 6

| Ink | Dot diameter (pm) | Evaluation of dot diameter | Stability of ink |
|---|---|---|---|
| Ink C1 | 106 | A | A |
| Ink C2 | 118 | A | A |
| Ink C3 | 112 | A | A |
| Ink C4 | 122 | A | A |

What is claimed is:

1. An ink jet recording method comprising the step of depositing a reaction solution containing a reactant and an ink composition onto a recording medium, wherein the reactant is a polyvalent metal salt or a polyallylamine or a derivative thereof and the ink composition comprises a resin emulsion, an inorganic oxide colloid or both, the reaction solution and the ink composition each having a surface tension of less than 40 mN/m.

2. The ink jet recording method according to claim 1, wherein the reactant is able to produce an agglomerate when coming into contact with the ink composition.

3. The ink jet recording method according to claim 1, wherein the ink composition comprises a pigment as a colorant.

4. The ink jet recording method according to claim 1, wherein the inorganic oxide colloid is colloidal silica.

5. The ink jet recording method according to claim 1, wherein the ink composition comprises an anionic surfactant having a polyoxyethylene group.

6. The ink jet recording method according to claim 5, wherein the anionic surfactant is a polyoxyethylene alkyl ether sulfate or a polyoxyethylene phenyl ether sulfate.

7. The ink jet recording method according to claim 5, wherein the anionic surfactant is sodium polyoxyethylene alkyl ether sulfate or sodium polyoxyethylene phenyl ether sulfate.

8. The ink jet recording method according to claim 7, wherein the sodium polyoxyethylene alkyl ether sulfate is represented by the following formula:

$$RO(CH_2CH_2O)_nSO_3Na$$

wherein R represents an alkyl group and n is an integer of 1 to 50.

9. A record medium recorded by the ink jet recording method according to claim 1.

* * * * *